United States Patent
Sakai et al.

(10) Patent No.: US 9,028,272 B2
(45) Date of Patent: May 12, 2015

(54) FOREIGN MATERIAL REMOVING STRUCTURE FOR CHARGER

(75) Inventors: Mamoru Sakai, Anjo (JP); Kouji Okamura, Anjo (JP)

(73) Assignee: Makita Corporation, Anjo-Shi (JP)

( * ) Notice: Subject to any disclaimer, the term of this patent is extended or adjusted under 35 U.S.C. 154(b) by 311 days.

(21) Appl. No.: 13/819,135

(22) PCT Filed: Aug. 31, 2011

(86) PCT No.: PCT/JP2011/069771
§ 371 (c)(1),
(2), (4) Date: Feb. 26, 2013

(87) PCT Pub. No.: WO2012/029850
PCT Pub. Date: Mar. 8, 2012

(65) Prior Publication Data
US 2013/0154565 A1    Jun. 20, 2013

(30) Foreign Application Priority Data
Aug. 31, 2010  (JP) .................................. 2010-194344

(51) Int. Cl.
*H01R 13/44* (2006.01)
*H01R 11/28* (2006.01)
*H01M 2/10* (2006.01)
(Continued)

(52) U.S. Cl.
CPC ............... *H01R 11/281* (2013.01); *H01R 13/44* (2013.01); *H01M 2/1022* (2013.01); *H01M 2/30* (2013.01); *H01R 13/11* (2013.01); *H02J 7/0045* (2013.01); *H02J 7/0042* (2013.01); *H01M 2220/30* (2013.01)

(58) Field of Classification Search
CPC .............................. H01R 13/44; H01R 11/281
See application file for complete search history.

(56) References Cited

U.S. PATENT DOCUMENTS

| | | |
|---|---|---|
| 6,109,939 A | 8/2000 | Kondo et al. |
| 6,346,793 B1 | 2/2002 | Shibata et al. |

(Continued)

FOREIGN PATENT DOCUMENTS

| | | |
|---|---|---|
| JP | A-11-53503 | 2/1999 |
| JP | A-2004-147360 | 5/2004 |

(Continued)

OTHER PUBLICATIONS

Nov. 29, 2011 International Search Report issued in International Application No. PCT/JP2011/069771.

*Primary Examiner* — James Harvey
(74) *Attorney, Agent, or Firm* — Oliff PLC

(57) ABSTRACT

A foreign material removing structure includes an inserting hole, a battery-side terminal, and a push-out section. The hole provided in a battery pack extends in an attaching direction of the pack, and has an opening that a charger-side terminal can enter, the opening being formed in one end side in an extending direction. The battery-side terminal is provided in the hole to contact the charger-side terminal that enters the hole from the opening when the pack is attached to the charger. The section provided on the further forward side in the attaching direction than the opening in the pack has a surface that intersects the attaching direction. The structure is configured such that the section is at a region shifted to the further forward side in the attaching direction than the charger-side terminal when the forward side in the attaching direction of the battery-side terminal contacts the charger-side terminal.

11 Claims, 14 Drawing Sheets

(51) Int. Cl.
*H01M 2/30* (2006.01)
*H02J 7/00* (2006.01)
*H01R 13/11* (2006.01)

(56) References Cited

U.S. PATENT DOCUMENTS

| | | | |
|---|---|---|---|
| 7,064,519 B2 | 6/2006 | Ito | |
| 8,087,945 B2 * | 1/2012 | Allwood | 439/135 |
| D714,722 S * | 10/2014 | Miller | D13/120 |
| 2004/0135542 A1 | 7/2004 | Ito | |
| 2011/0005793 A1 * | 1/2011 | Hanawa et al. | 173/217 |
| 2013/0154565 A1 * | 6/2013 | Sakai et al. | 320/113 |

FOREIGN PATENT DOCUMENTS

| JP | B2-3553835 | 8/2004 |
|---|---|---|
| JP | A-2006-50789 | 2/2006 |

\* cited by examiner

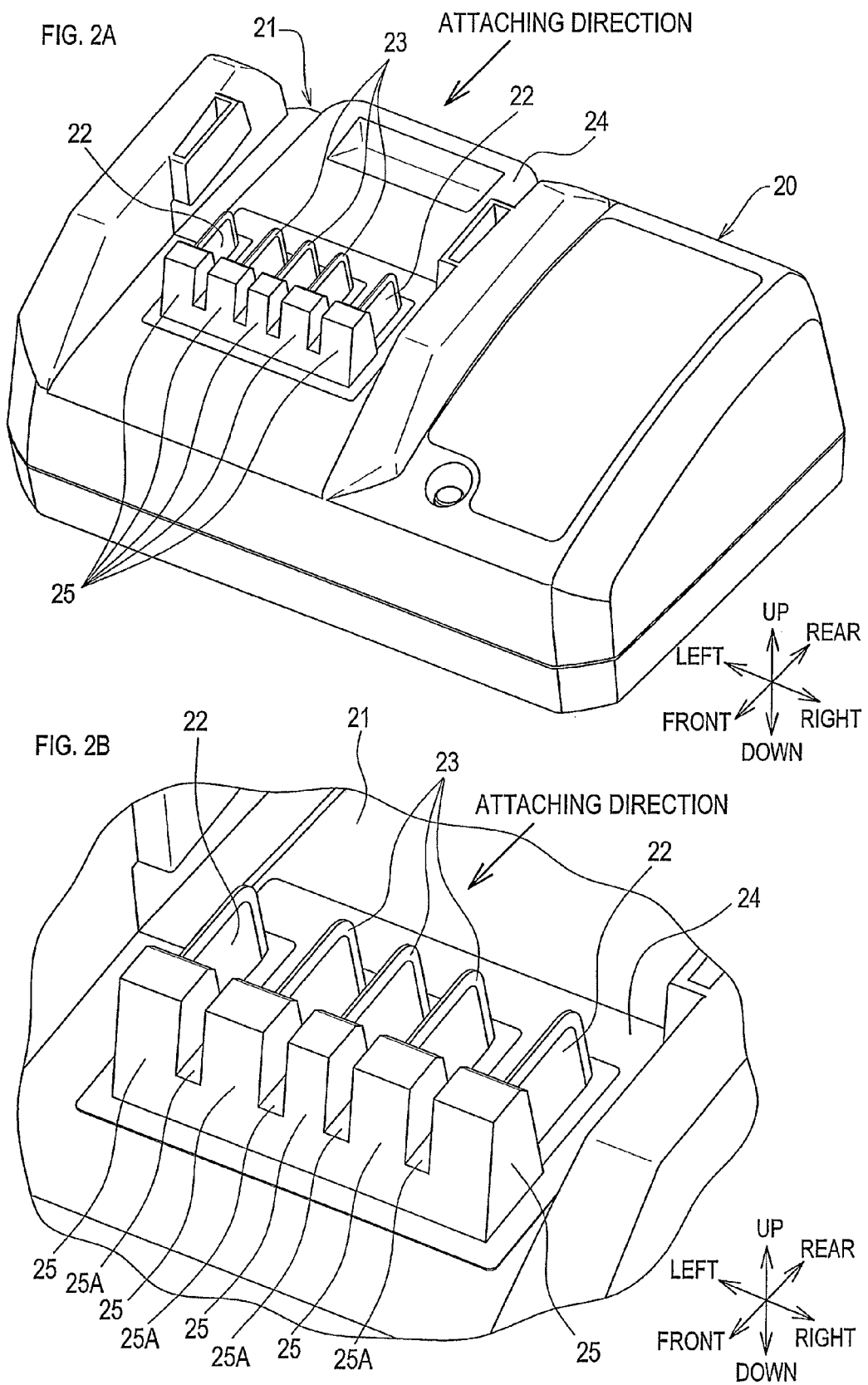

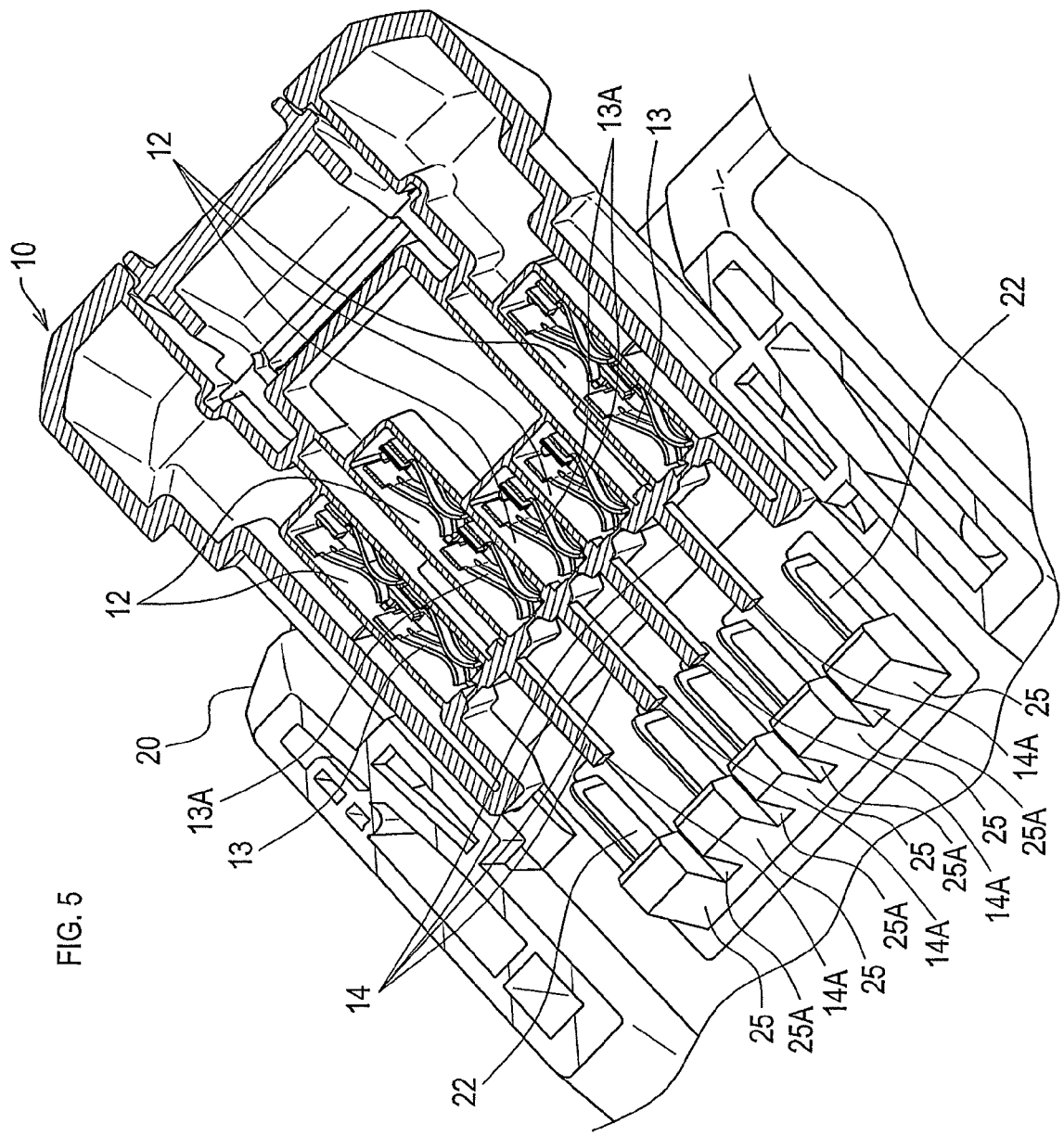

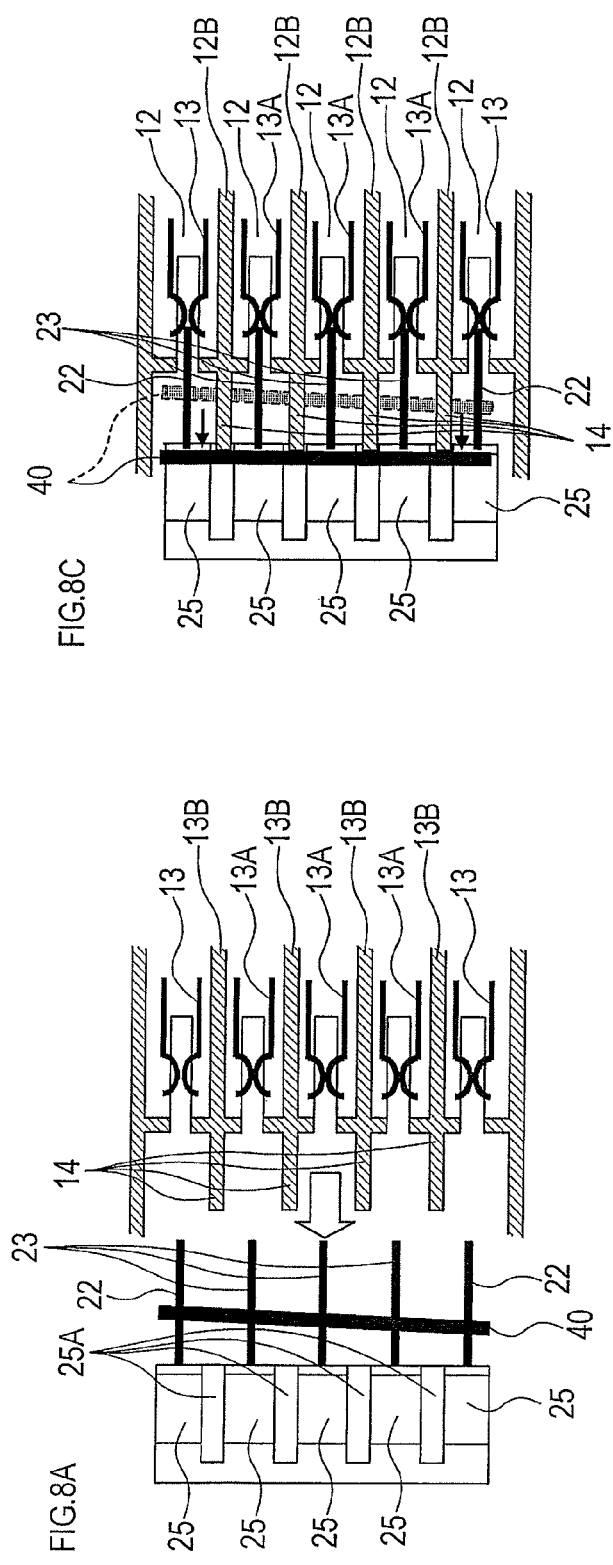

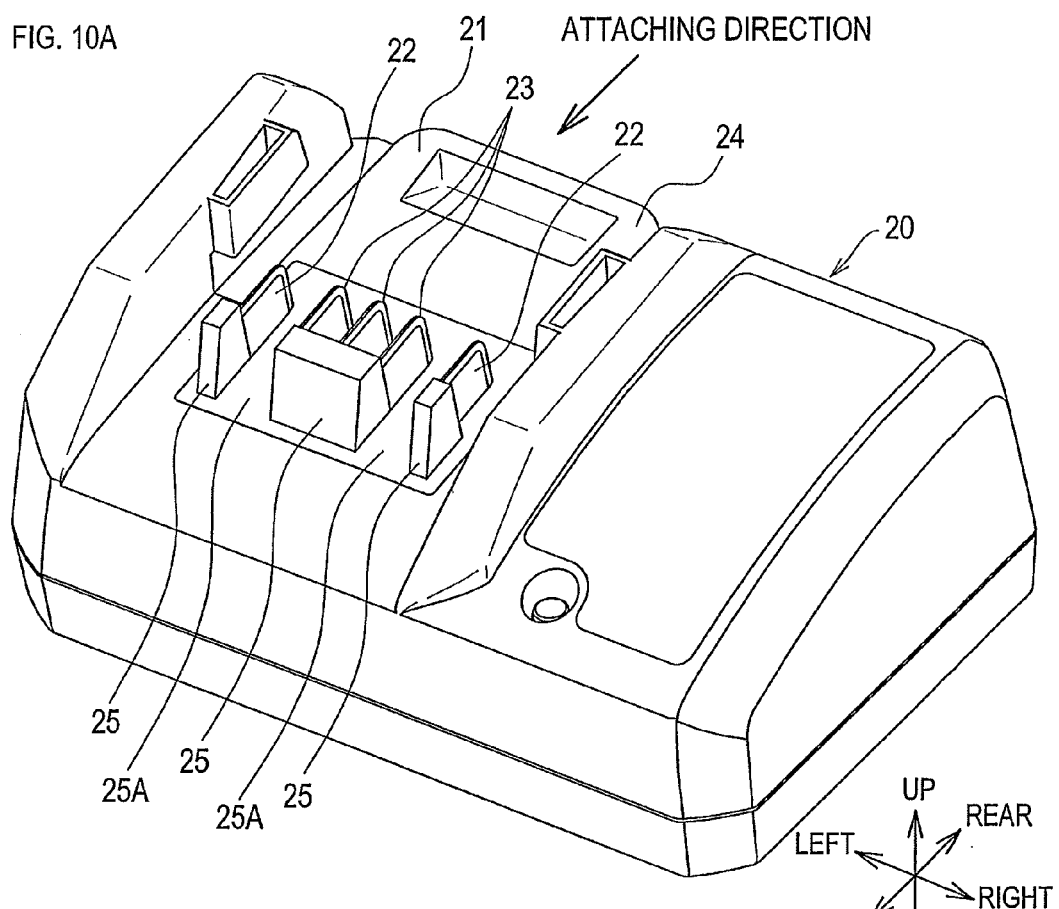
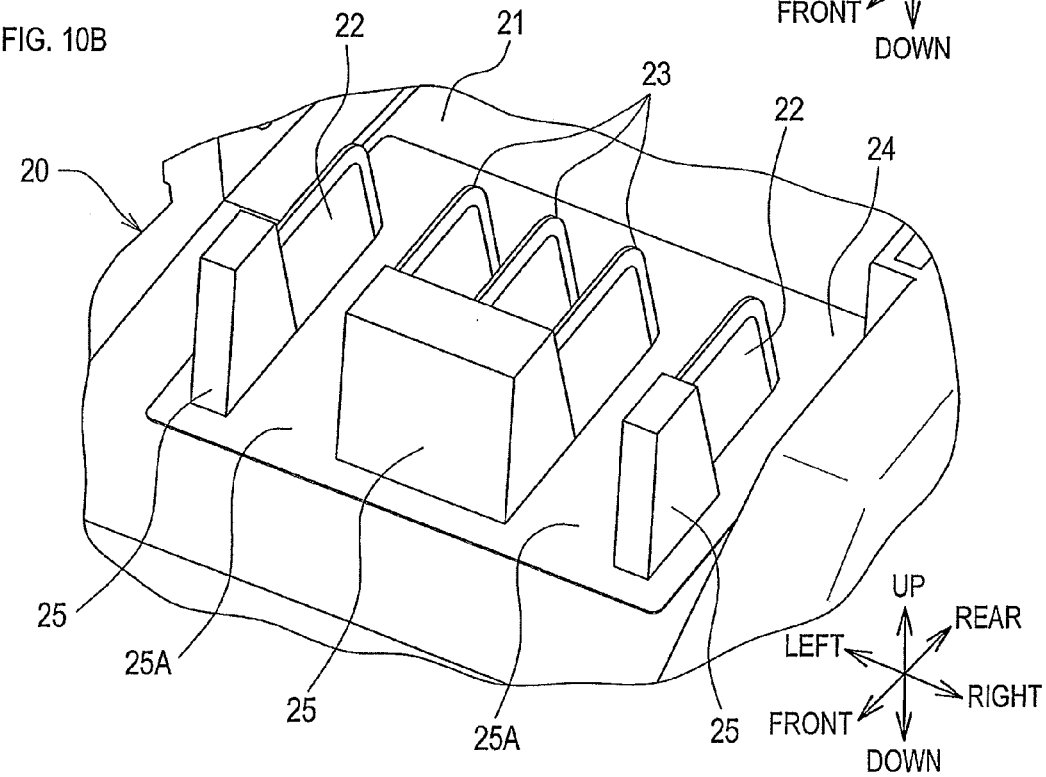

ATTACHING DIRECTION ←

ATTACHING DIRECTION ←

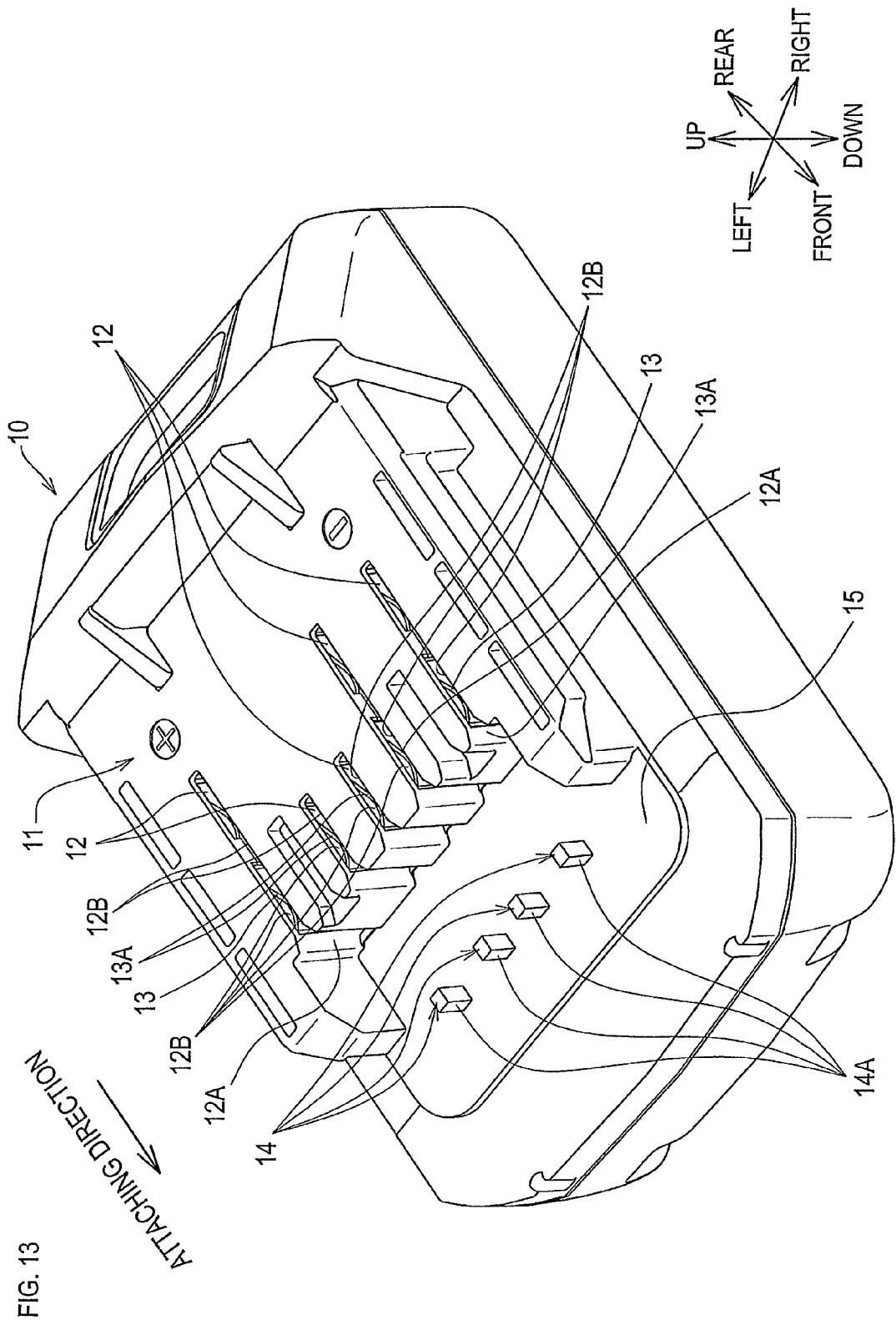

FOREIGN MATERIAL REMOVING STRUCTURE FOR CHARGER

CROSS-REFERENCE TO RELATED APPLICATIONS

This international application claims the benefit of Japanese Patent Application No. 2010-194344 filed Aug. 31, 2010 in the Japan Patent Office, and the entire disclosure of which is incorporated herein by reference.

TECHNICAL FIELD

The present invention is applied to a battery pack for electric power tool and a charger to which the battery pack is detachably attached, and relates to a foreign material removing structure for removing foreign material adhering to a charger-side terminal.

BACKGROUND ART

For example, a charger described in Patent Document 1 below is provided with a slide cover that covers an upper surface side of a charging terminal to prevent foreign material from adhering to the charging terminal.

PRIOR ART DOCUMENTS

Patent Documents

Patent Document 1: Japanese Unexamined Patent Application Publication No. 2004-147360

SUMMARY OF THE INVENTION

Problems to be Solved by the Invention

However, there are cases in which it is difficult to prevent foreign material from adhering to the charging terminal only by the slide cover. If foreign material adheres to the charging terminal, it is necessary that the foreign material is removed before the battery pack is attached to the charger.

In view of the above, one object of the present invention is to provide a foreign material removing structure that can easily remove foreign material even if the foreign material adheres to the charger-side terminal.

Means for Solving the Problems

The present invention provides a foreign material removing structure for removing foreign material adhering to a charger-side terminal of a charger to which a battery pack for electric power tool is detachably attached. The foreign material removing structure includes an inserting hole, a battery-side terminal, and a push-out section. The inserting hole is provided in the battery pack, extends along an attaching direction of the battery pack, and includes an opening that the charger-side terminal can enter. The opening is formed on one end side in an extending direction of the inserting hole. The battery-side terminal is provided in the inserting hole and is to be in contact with the charger-side terminal that enters the inserting hole from the opening when the battery pack is attached to the charger. The push-out section is provided on a further forward side in the attaching direction than the opening in the battery pack, and has a surface that intersects the attaching direction. The foreign material removing structure is configured such that the push-out section is located at a region shifted to the further forward side in the attaching direction than the charger-side terminal when the forward side in the attaching direction of the battery-side terminal is in contact with the charger-side terminal.

In the present invention, when the battery pack is attached to the charger in a state where foreign material adheres to the charger-side terminal, the push-out section is in contact with the foreign material adhering to the charger-side terminal before the battery-side terminal is in contact with the charger-side terminal. Thus, if the battery pack proceeds to the forward side in the attaching direction, the foreign material is pushed by the push-out section in response thereto, and pushed out to a region shifted from the charger-side terminal.

Therefore, in the present invention, since the foreign material adhering to the charger-side terminal is pushed out to the region shifted from the charger-side terminal by the push-out section upon attaching the battery pack to the charger, the foreign material can be easily removed even if the foreign material adheres to the charger-side terminal.

In addition, a size from a surface of the push-out section to the battery-side terminal may be greater than a size of a region parallel to the attaching direction in the charger-side terminal.

Also, the charger-side terminal may protrude in a direction orthogonal to the attaching direction from a base surface of the charger. The push-out section may have a shape that protrudes in the direction orthogonal to the attaching direction from an outer wall surface of the battery pack. Furthermore, when the battery pack is attached to the charger, the outer wall surface of the battery pack and the base surface of the charger may be opposed to each other, and a tip end in a protruding direction of the push-out section may be located further on the base surface side than a tip end in a protruding direction of the charger-side terminal.

In addition, the foreign material removing structure may include a holding section made of electrically insulating material that is located on the forward side in the attaching direction with respect to the charger-side terminal and protrudes in a direction parallel to the protruding direction of the charger-side terminal from the base surface to hold the charger-side terminal. A holding section height which is a size from the base surface to the tip end in the protruding direction of the holding section may be equal to or less than a terminal height which is a size from the base surface to the tip end in the protruding direction of the charger-side terminal.

Alternatively, the holding section height on the charger-side terminal side in the holding section may be equal to or less than the terminal height on the holding section side in the charger-side terminal. Further, a tapered surface may be provided on the charger-side terminal side of the holding section. In the tapered surface, the holding section height may gradually increase with increase in distance from the charger-side terminal to the forward side in the attaching direction.

Also, the inserting hole may have a pair of side wall sections that are provided so as to be opposed to each other across the battery-side terminal and extend from the opening to a rearward side in the attaching direction. Further, the push-out section may be provided at a region corresponding to one of the pair of side wall sections.

In addition, the push-out section may be configured as a protrusion that extends from one of the pair of side wall sections to the forward side in the attaching direction.

In addition, the holding section may be provided at a position shifted from a region corresponding to the push-out section.

The charger-side terminal and the battery-side terminal may be any terminals, including, for example, a charging terminal and a communication terminal.

BRIEF DESCRIPTION OF THE DRAWINGS

FIGS. 2A and 2B illustrate an outer appearance of a charger according to the first embodiment, in which FIG. 2A is a perspective view of the entire charger, and FIG. 2B is an enlarged perspective view of a charger-side terminal of the charger.

FIGS. 3A and 3B illustrate an outer appearance of a battery pack according to the first embodiment, in which FIG. 3A is a perspective view of the entire battery pack, and FIG. 3B is an enlarged perspective view of a push-out section, etc. of the battery pack.

FIG. 5 is an explanatory diagram showing a state in which the battery pack is being attached to the charger.

FIGS. 8A-8D are diagrams showing a state in which foreign material attached to the charger-side terminal is being removed.

FIGS. 9A and 9B illustrate an outer appearance of a battery pack according to a second embodiment of the present invention, in which FIG. 9A is a perspective view of the entire battery pack, and FIG. 9B is an enlarged perspective view of a push-out section, etc. of the battery pack.

FIGS. 10A and 10B illustrate an outer appearance of a charger according to the second embodiment, in which FIG. 10A is a perspective view of the entire charger, and FIG. 10B is an enlarged perspective view of a charger-side terminal of the charger.

FIG. 13 is an external perspective view of a battery pack according to a fourth embodiment of the present invention.

EXPLANATION OF REFERENCE NUMERALS

1 . . . electric power tool, 2 . . . handle section, 3 . . . tool body section, 10 . . . battery pack, 11 . . . attaching section, 12 . . . inserting hole, 12A . . . opening, 12B . . . side wall section, 13 . . . charging terminal, 13A . . . communication terminal, 14 . . . push-out section, 14A . . . front end surface, 15 . . . cover, 20 . . . charger, 21 . . . attaching section, 22 . . . charging terminal, 23 . . . communication terminal, 24 . . . cover, 25 . . . holding section, 25A . . . gap, 25B . . . tapered surface, 40 . . . foreign material Mode for Carrying out the Invention Hereinafter, some embodiments according to the present invention will be described with reference to the accompanying drawings.

In the following embodiments, foreign material removing structures according to the present invention are applied to a battery pack and a charger for electric power tool such as an electric powered screwdriver and an electric powered drill.

(First Embodiment)
1. Outline of Battery Pack and Charger

Figure 1:
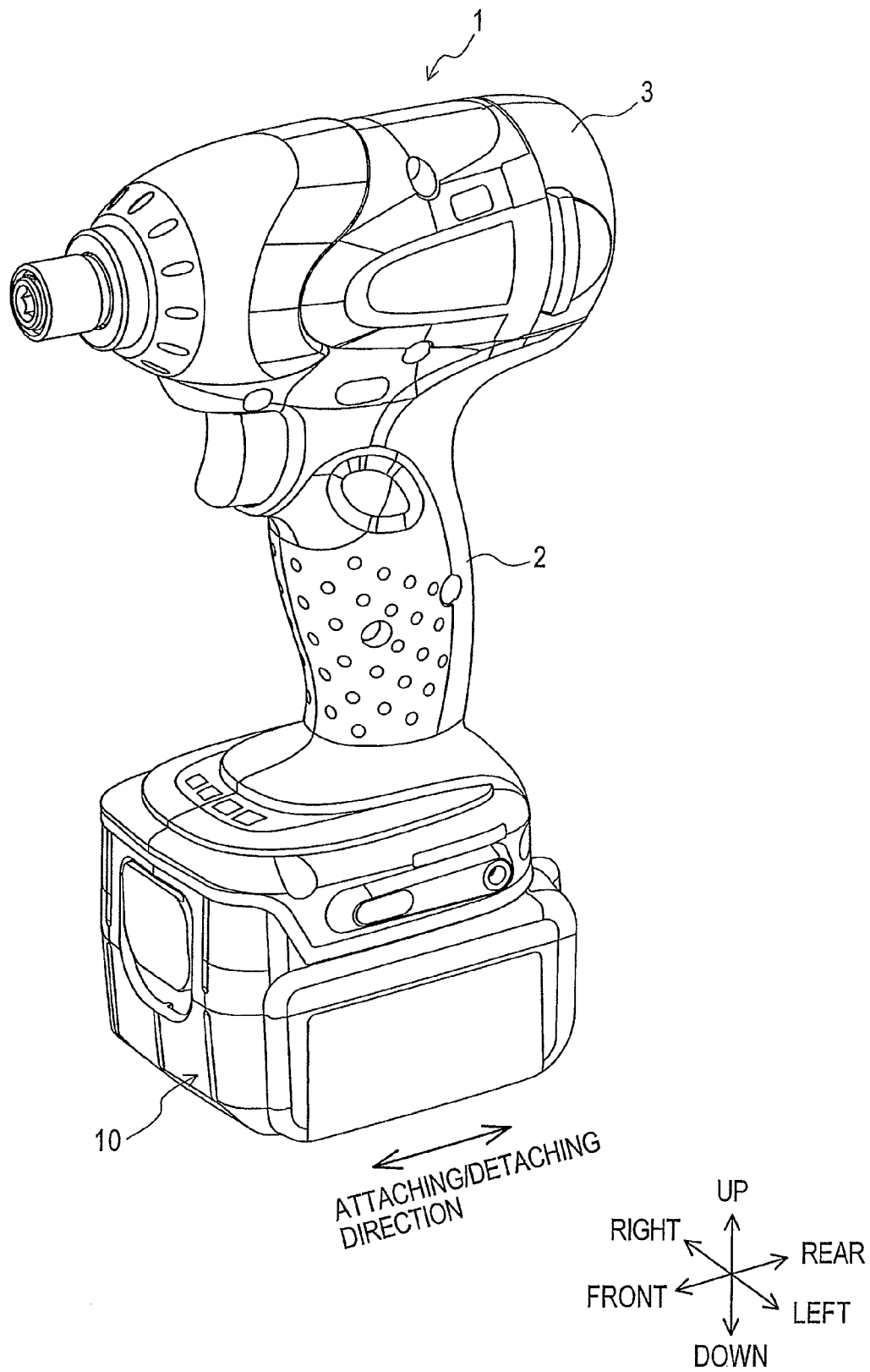
FIG. 1 is an external view of an electric power tool according to a first embodiment of the present invention.

As shown in FIG. 1, an electric power tool 1 in the first embodiment is provided with a handle section 2 for an operator to grip, and a tool body section 3 provided on one end side in a longitudinal direction of the handle section 2. An electric motor (not shown) is housed in the tool body section 3.

To an other end in the longitudinal direction of the handle section 2, a battery pack 10 that supplies electric power to the electric power tool 1 is detachably attached. The battery pack 10 can be attached to or detached from the electric power tool 1 by being moved in a direction intersecting (in a direction orthogonal to, for example) the longitudinal direction of the handle section 2.

As shown in FIG. 2A, a charger 20 for charging the battery pack 10 is provided with an attaching section 21 to which the battery pack 10 is detachably attached. The attaching section 21 is provided with a pair of metal charging terminals 22 that supply electric power to the battery pack 10.

Up-down directions, left-right directions, and front-rear directions described in FIG. 2A are assigned for convenience to facilitate the following description. In an actual use state, those directions are not necessarily limited to the directions shown in the figure.

The right-side charging terminal 22 in the drawing out of the pair of charging terminals 22 is a terminal for a positive (+) electrode, and the left-side charging terminal 22 in the drawing is a terminal for a negative (−) electrode. A plurality of communication terminals 23 provided between the pair of charging terminals 22 are terminals for transmitting and receiving signals between the battery pack 10 and the charger 20. Unless otherwise noted in the following, the charging terminals 22 are intended to mean the pair of charging terminals 22.

2. Foreign Material Removing Structure for Charger

Figure 3A:
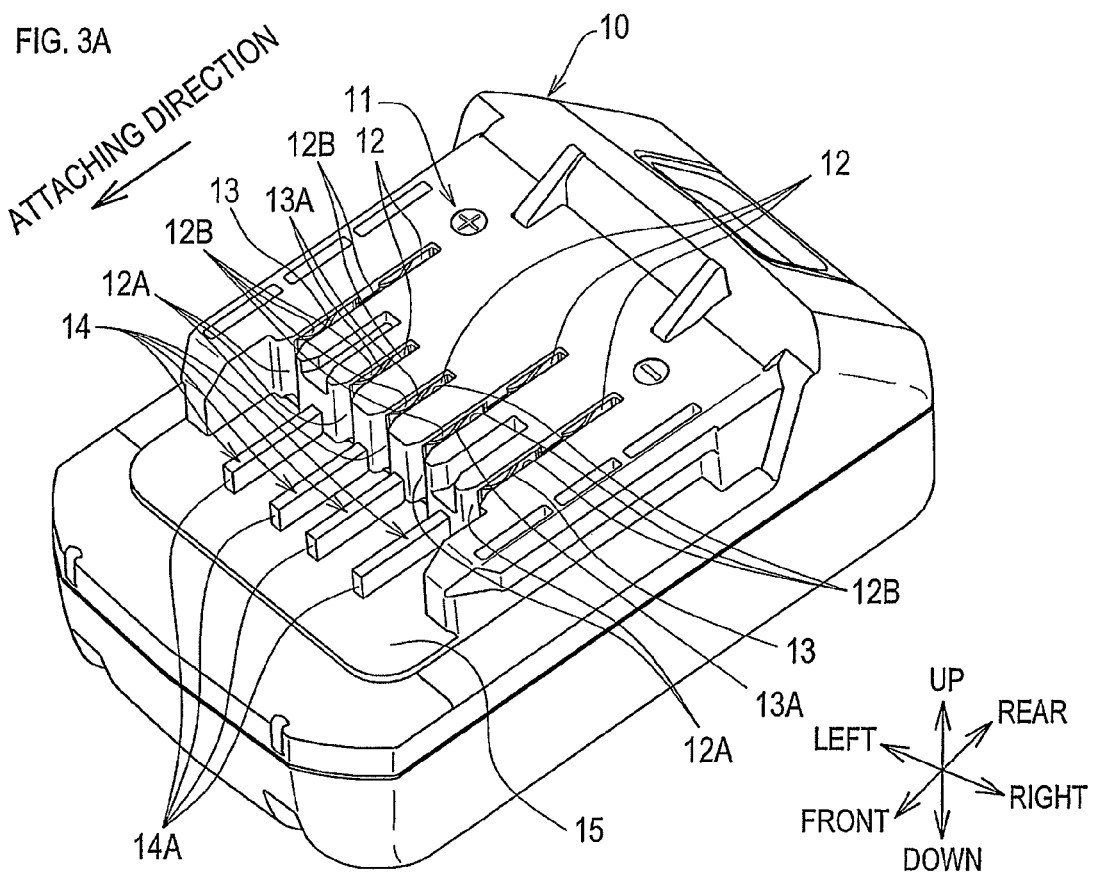

As shown in FIG. 3A, an attaching section 11 of the battery pack 10 is provided on an upper surface section of the cube-shaped battery pack 10. By attaching the attaching section 11 to the charger 20 or the electric power tool 1 (handle section 2), the battery pack 10 is electrically connected to the charger 20 or the electric power tool 1.

Here, up-down directions, left-right directions, and front-rear directions described in FIG. 3A are assigned for convenience to facilitate the following description. In an actual use state, those directions are not necessarily limited to the directions shown in the figure.

Further, when the battery pack 10 is attached to the charger 20, the attaching section 21 of the charger 20 and the attaching section 11 of the battery pack 10 are opposed to each other. Thus, for example, when the attaching section 21 of the charger 20 is located on an upper surface side of the charger 20, as shown in FIG. 2A, the attaching section 11 of the battery pack 10 faces downward as shown in FIG. 4A.

Figure 4A:
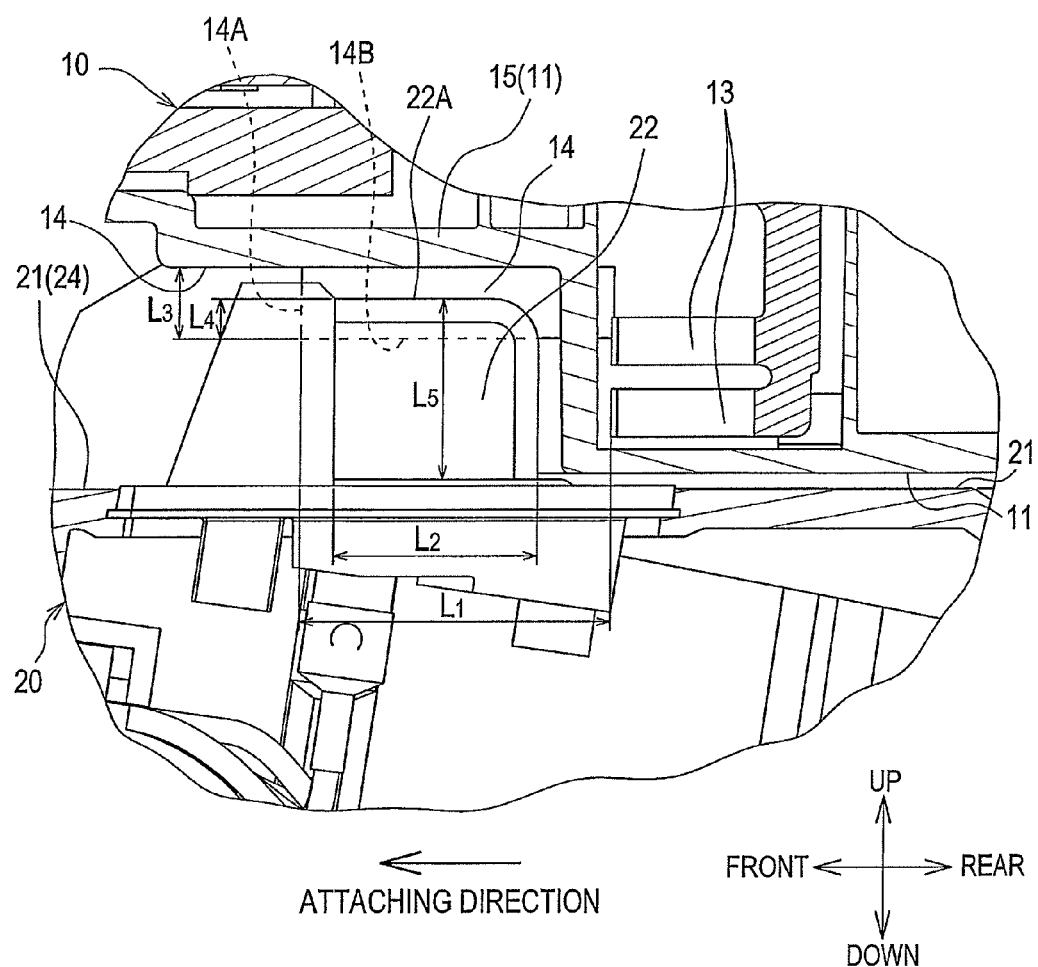
FIG. 4A is a cross-sectional view of the charger-side terminal and the push-out section in a case where the battery pack according to the first embodiment is attached to the charger.

Here, up-down directions and front-rear directions described in FIG. 4A are assigned for convenience to correspond to the up-down directions and front-rear directions described in FIGS. 2A and 3A to facilitate understanding. In an actual use state, those directions are not necessarily limited to the directions shown in the figure.

Then, as shown in FIG. 3A, in the attaching section 11 of the battery pack 10, a plurality of inserting holes 12 extending along the attaching direction of the battery pack 10 (in the present embodiment, the front and rear directions shown in FIG. 3A) are provided. At one end side of the extending direction of these inserting holes 12 (in the present embodiment, the front side shown in FIG. 3A), openings 12A which the charging terminals 22 and the communication terminals 23 (hereinafter, these terminals are collectively referred to as "charger-side terminals 22, 23") can enter are provided (see FIG. 3B).

Further, in each of the inserting holes 12, a metallic charging terminal 13 or a metallic communication terminal 13A is provided. The charging terminal 13 is a terminal that contacts the charging terminal 22 which enters the inserting hole 12 from the opening 12A when the battery pack 10 is attached to the charger 20. The communication terminal 13A is a terminal that contacts the communication terminal 23 which enters the inserting hole 12 from the opening 12A when the battery pack 10 is attached to the charger 20.

Figure 3B:
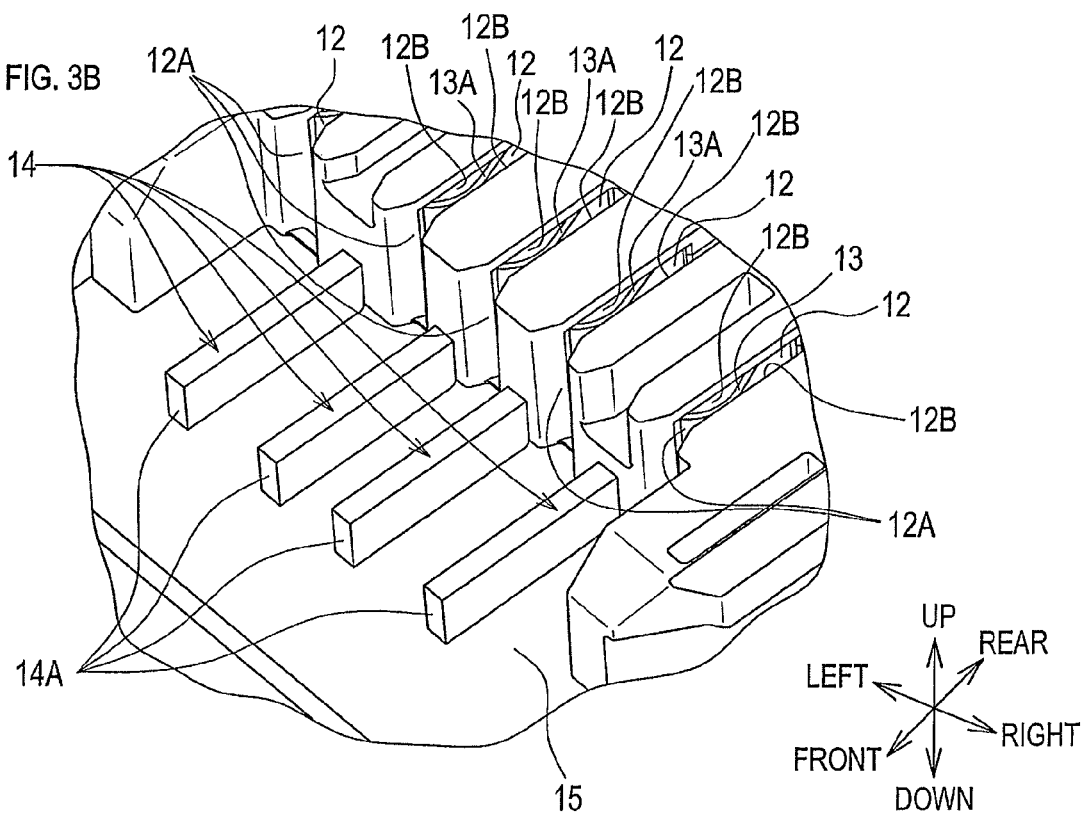

As shown in FIG. 3B, each of the inserting holes 12, in a direction orthogonal to the attaching direction (left-right directions in FIG. 3B), is a groove formed by a pair of side wall sections 12B facing each other across the charging terminal 13 or communication terminal 13A. Each of the side wall sections 12B extends to a rearward side in the attaching direction (rear side of FIG. 3A) from the opening 12A. Each of the charging terminals 13 and the communication terminals 13A (hereinafter, these terminals are collectively referred to as "battery-side terminals 13, 13A") are protected by the corresponding pair of side wall sections 12B.

That is, in the battery pack 10 according to the present embodiment, since the battery-side terminals 13, 13A are disposed in the inserting holes 12, external force applied to the battery pack 10 is received by the side wall sections 12B. Therefore, direct application of the external force to the battery-side terminals 13, 13A can be suppressed. Even if the battery pack 10 is roughly treated, the battery-side terminals 13, 13A can be inhibited from being damaged.

On the further forward side in the attaching direction than the openings 12A in the attaching section 11 of the battery pack 10, that is, on the further front side than the openings 12A, a plurality of push-out sections 14 each having a plane 14A (front end surface 14A) orthogonal to the attaching direction are provided. The push-out sections 14 and the sidewall sections 12B are integrally molded with a cover 15 with an insulating material such as resin.

In addition, the push-out sections 14 are formed as protrusions. More particularly, each of the push-out sections 14 protrudes in a direction orthogonal to the attaching direction (up-down directions in FIG. 3B) from the cover 15 constituting the attaching section 11, and extends to the forward side in the attaching direction from a region corresponding to the side wall section 12B.

In addition, each of the charger-side terminals 22, 23, as the shown in FIG. 2B, protrudes in a direction orthogonal to the attaching direction (up-down direction in FIG. 2B) from a cover 24 made of resin and constituting the attaching section 21, and is configured into a plate which extends in the attaching direction. In the present embodiment, in order to simplify the description, the charger-side terminals 22, 23 are configured so as to have identical shape and size to each other. The charger-side terminals 22, 23 may be configured to have different shape and size from each other.

Therefore, in a state where the battery pack 10 is attached to the charger 20, the cover 15 of the battery pack 10 (attaching section 11) and the cover 24 of the charger 20 (attaching section 21) are opposed to each other. Furthermore, as shown in FIG. 4A, in a state where the battery pack 10 is attached to the charger 20, the push-out sections 14 protrude to the cover 24 side of the charger 20 from the cover 15, while the charger-side terminals 22, 23 (in FIG. 4A, only the charging terminal 22 is shown) protrude to the cover 15 side of the battery pack 10 from the cover 24.

Because a size L1 from the front end surfaces 14A of the push-out sections 14 to the battery-side terminals 13, 13A is set to be greater than a size L2 of a region parallel to the attaching direction in the charger-side terminals 22, 23, the front end surfaces 14A of the push-out sections 14, when the forward side in the attaching direction in the battery-side terminals 13, 13A is in contact with the charger-side terminals 22, 23, are to be located at a region shifted to the further forward side in the attaching direction (front side in FIG. 4A) than the charger-side terminals 22, 23.

Further, a protruding size L3 of the push-out sections 14, in the state where the battery pack 10 is attached to the charger 20, is set to be a size such that tip ends 14B in the protruding direction of the push-out sections 14 are located at a lower side (cover 24 side) than tip ends in the protruding direction of the charger-side terminals 22, 23 (in FIG. 4A, only the tip end 22A in the protruding direction of the charging terminal 22 is shown). In the present embodiment, an overlap size L4 of the push-out sections 14 and the charger-side terminals 22, 23 is set to be about 20% or more of a protruding size L5 of the charger-side terminals 22, 23. However, the overlap size L4 is not limited to the size in the present embodiment, and may be set in any way.

As shown in FIG. 2B, the charger-side terminals 22, 23 are secured to the cover 24 by insert molding or the like, and held by a plurality of holding sections 25 provided on the forward side in the attaching direction (front end size in FIG. 2B). These holding sections 25 protrude in a direction parallel to the protruding direction of the charger-side terminals 22, 23 from the cover 24 and are formed into a block integrally molded with the cover 24.

In addition, each of the holding sections 25 is provided corresponding to each of the charger-side terminals 22, 23. A gap 25A which the push-out sections 14 can pass through is provided between each of the holding sections 25 (see FIG. 7). That is, in the present embodiment, each of the holding sections 25 holds the front end side of each of the charger-side terminals 22, 23, and is provided at a position shifted from a region corresponding to the push-out sections 14, so as to avoid interference with the push-out sections 14 when the battery pack 10 is attached to the charger 20.

The holding sections 25 are formed so as to cover the charger-side terminals 22, 23 and the openings 12A of the battery pack 10, when the battery pack 10 is attached to the charger 20. Therefore, in the state where the battery pack 10 is attached to the charger 20, it is not possible to touch the charger-side terminals 22, 23 and the battery-side terminals 13, 13A from the forward (gaps 25A) side in the attaching direction.

Figure 4B:
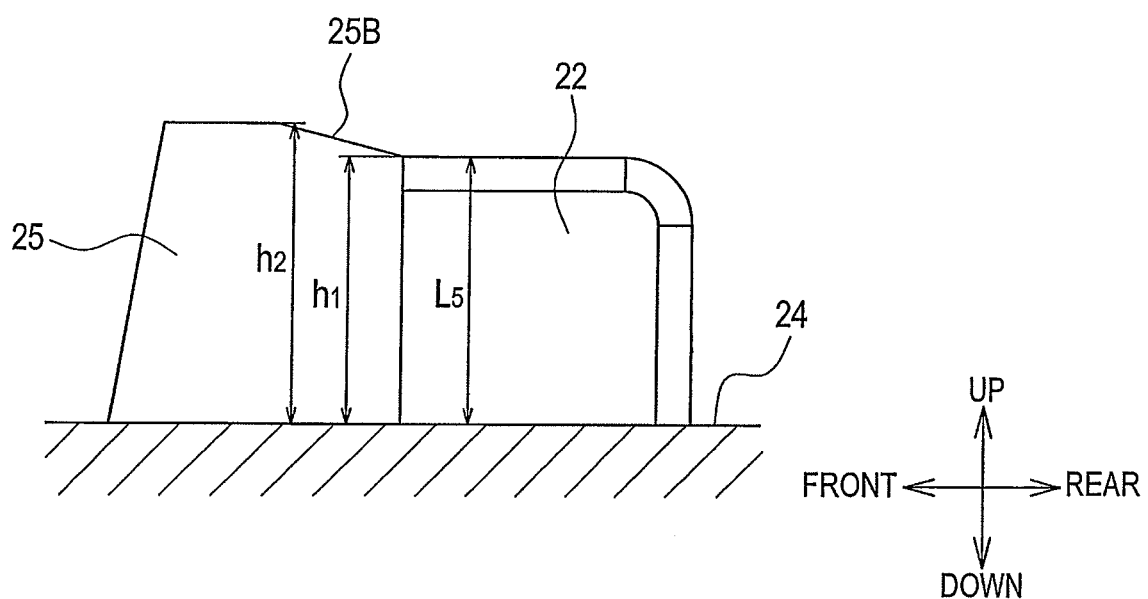
FIG. 4B is a side view of the charger-side terminal according to the first embodiment.

A holding section height h1 on the charger-side terminals 22, 23 side in the holding section 25, as shown in FIG. 4B, is equal to or less than a terminal height L5 on the holding section 25 side in the charger-side terminals 22, 23 (in FIG. 4B, only the charging terminal 22 is shown). On the charger-side terminal 22, 23 side in the holding sections 25, a tapered surface 25B is provided in which a holding section height h2 gradually increases with increase in distance from the charger-side terminals 22, 23 to the forward side in the attaching direction (front side in FIG. 4B).

Here, the holding section height refers to a size from the cover 24 to the tip ends in the protruding direction of the holding sections 25. The terminal height refers to a size from the cover 24 to the tip ends in the protruding direction of the charger-side terminals 22, 23.

Figure 6:
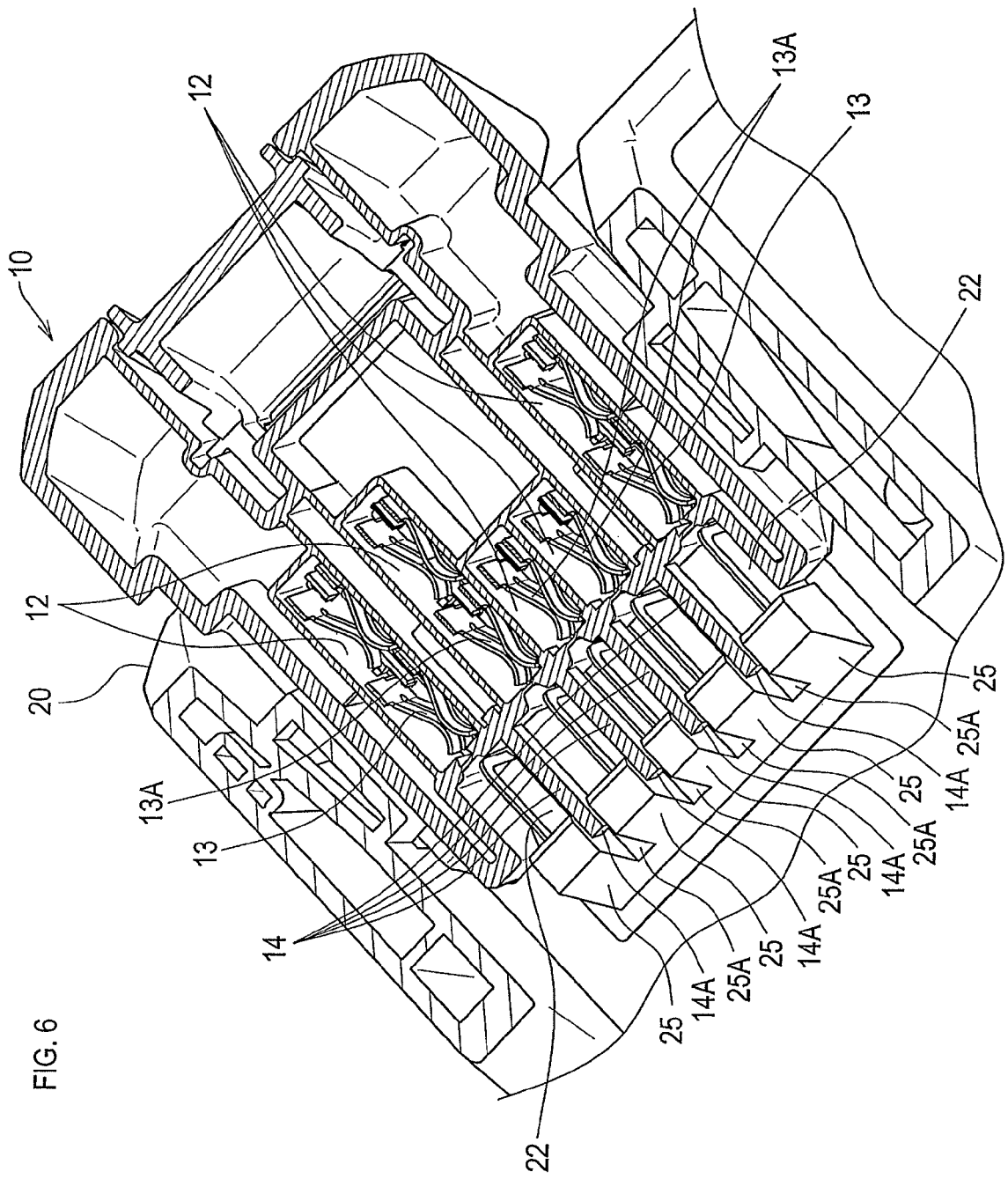
FIG. 6 is an explanatory diagram showing a state in which the battery pack is being attached to the charger.
Figure 7:
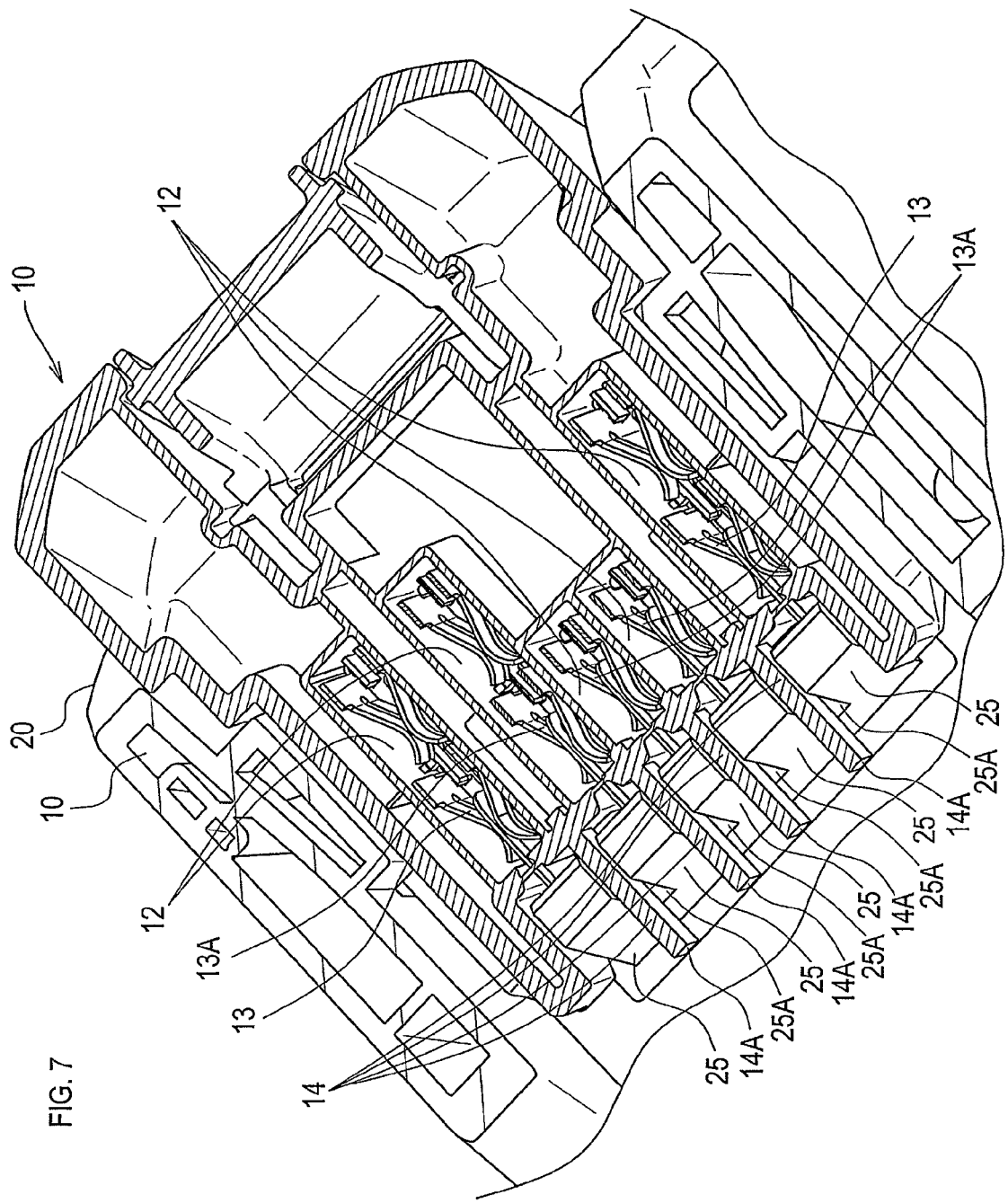
FIG. 7 is an explanatory view showing a state in which the battery pack is attached to the charger.

3. Features of Foreign Material Removing Structure for Charger According to Present Embodiment In the present embodiment, the push-out sections 14 are provided on the further forward side in the attaching direction than the openings 12A in the battery pack 10. Thus, as shown in FIGS. 5, 6 and 7 sequentially, as attachment of the battery pack 10 to the charger 20 progresses, the front end surfaces 14A of the push-out sections 14 move to the forward side in the attaching direction.

Therefore, if the battery pack 10 is attached to the charger 20 in a state where foreign material 40 adheres to at least part of the charger-side terminals 22, 23 (see FIGS. 8A and 8B), the push-out sections 14 come into contact with the foreign material 40 adhering to the charger-side terminals 22, 23 before the battery-side terminals 13, 13A are brought into contact with the charger-side terminals 22, 23. Therefore, as shown in FIGS. 8C and 8D, when the battery pack 10 advances to the forward side in the attaching direction, the foreign material 40 is pushed in response thereto by the push-out sections 14, and pushed out to a region shifted from the charger-side terminals 22, 23.

Thus, in the present embodiment, upon attaching the battery pack 10 to the charger 20, the push-out sections 14 push out the foreign material 40 adhering to the charger-side terminals 22, 23 to the region shifted from the charger-side terminals 22, 23. Thus, even if the foreign material 40 adheres to the charger-side terminals 22, 23, it is possible to easily remove the foreign material 40.

In the present embodiment, the holding sections 25 are made of resin which is an electrically insulating material. Thus, if the foreign material 40 is moved at least to the holding sections 25, occurrence of electrical defects due to adhesion of the foreign material 40 to the charger-side terminals 22, 23 can be suppressed in advance.

Further, in the present embodiment, the charger-side terminals 22, 23 are in forms of protruding in a direction orthogonal to the attaching direction from the cover 24 of the charger 20, and the push-out sections 14 are in forms of protruding in a direction parallel to the protruding direction of the charger-side terminals 22, 23 from the cover 15 of the battery pack 10. Furthermore, in a case where the battery pack 10 is attached to the charger 20, the tip ends 14B in the protruding direction of the push-out section 14s are, as shown in FIG. 4A, located further on the cover 24 side than the tip ends in the protruding direction of the charger-side terminals 22, 23. Thus, the foreign material 40 adhering to the tip ends in the protruding direction of the charger-side terminals 22, 23 can be reliably moved to a region shifted from the charger-side terminals 22, 23 (see FIG. 8D).

Also, in the present embodiment, as shown in FIG. 4B, the tapered surface 25B in which a holding section height h2 gradually increases with increase in distance from the charger-side terminals 22, 23 to the forward side in the attaching direction is provided on the charger-side terminals 22, 23 side in the holding sections 25. Thus, there is no staircase-like step between the holding sections 25 and the charger-side terminals 22, 23. The foreign material 40 adhering to the tip ends in the protruding direction of the charger-side terminals 22, 23 can be reliably moved to a region shifted from the charger-side terminals 22, 23 (see FIG. 8D).

4. Correspondence Between Inventive Feature and Embodiment

In the present embodiment, the cover 15 corresponds to an example of an outer wall surface of a battery pack in the present invention, the cover 24 corresponds to an example of a base surface of a charger of the present invention, the charging terminal 22 and communication terminal 23 correspond to an example of a charger-side terminal in the present invention, and the charging terminal 13 and communication terminal 13A correspond to an example of a battery-side terminal of the present invention.

(Second Embodiment)

Figure 9A:
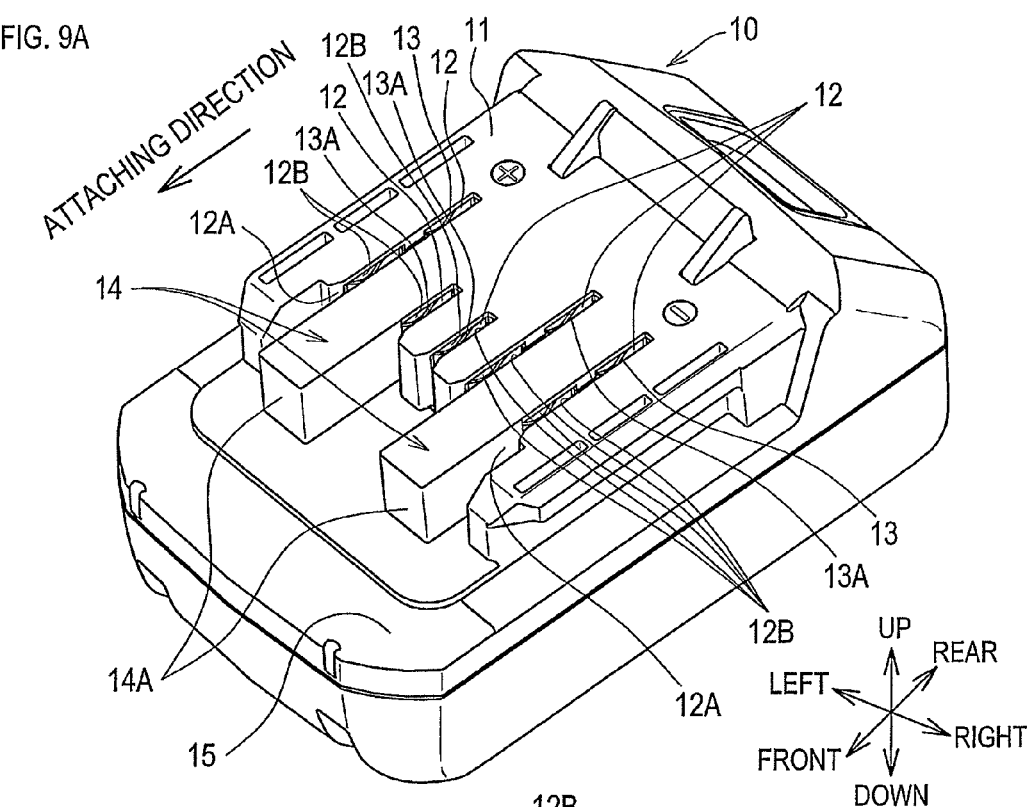
Figure 9B:
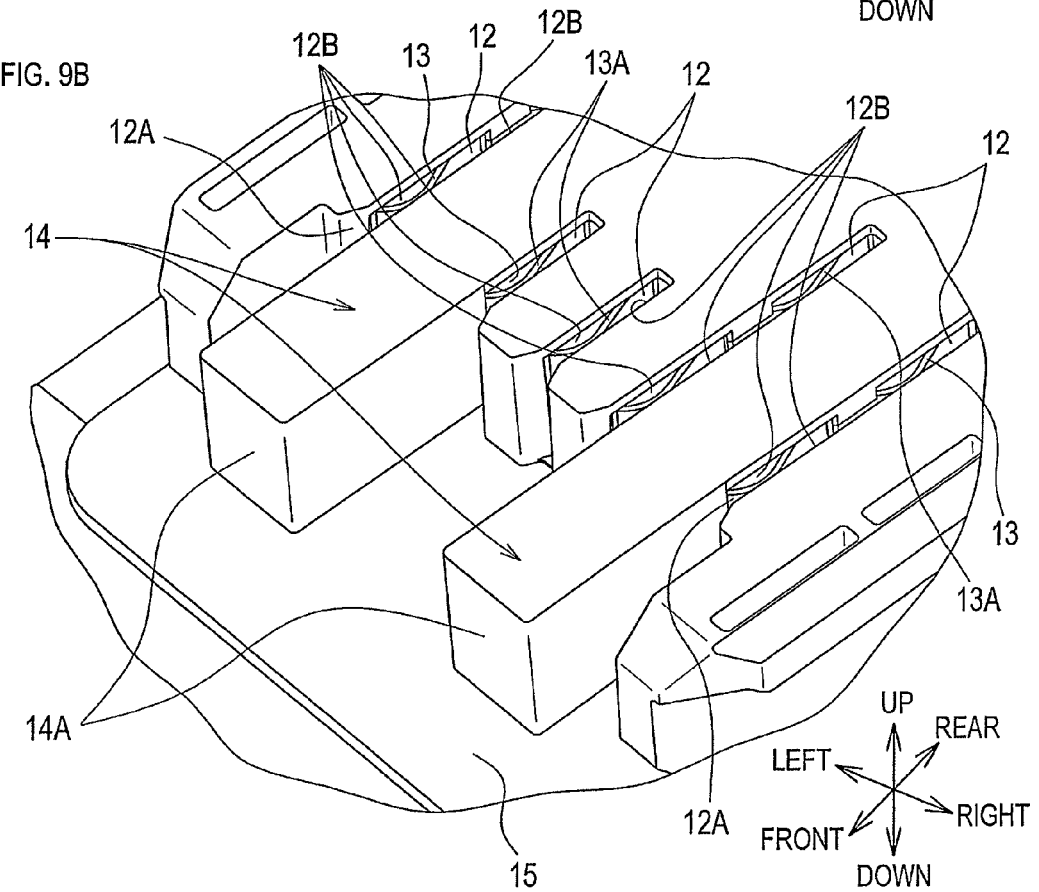

In the present embodiment, the push-out sections 14 are formed by extending part of the side wall sections 12B to the forward side in the attaching direction, as shown in FIGS. 9A and 9B.

Figure 11:
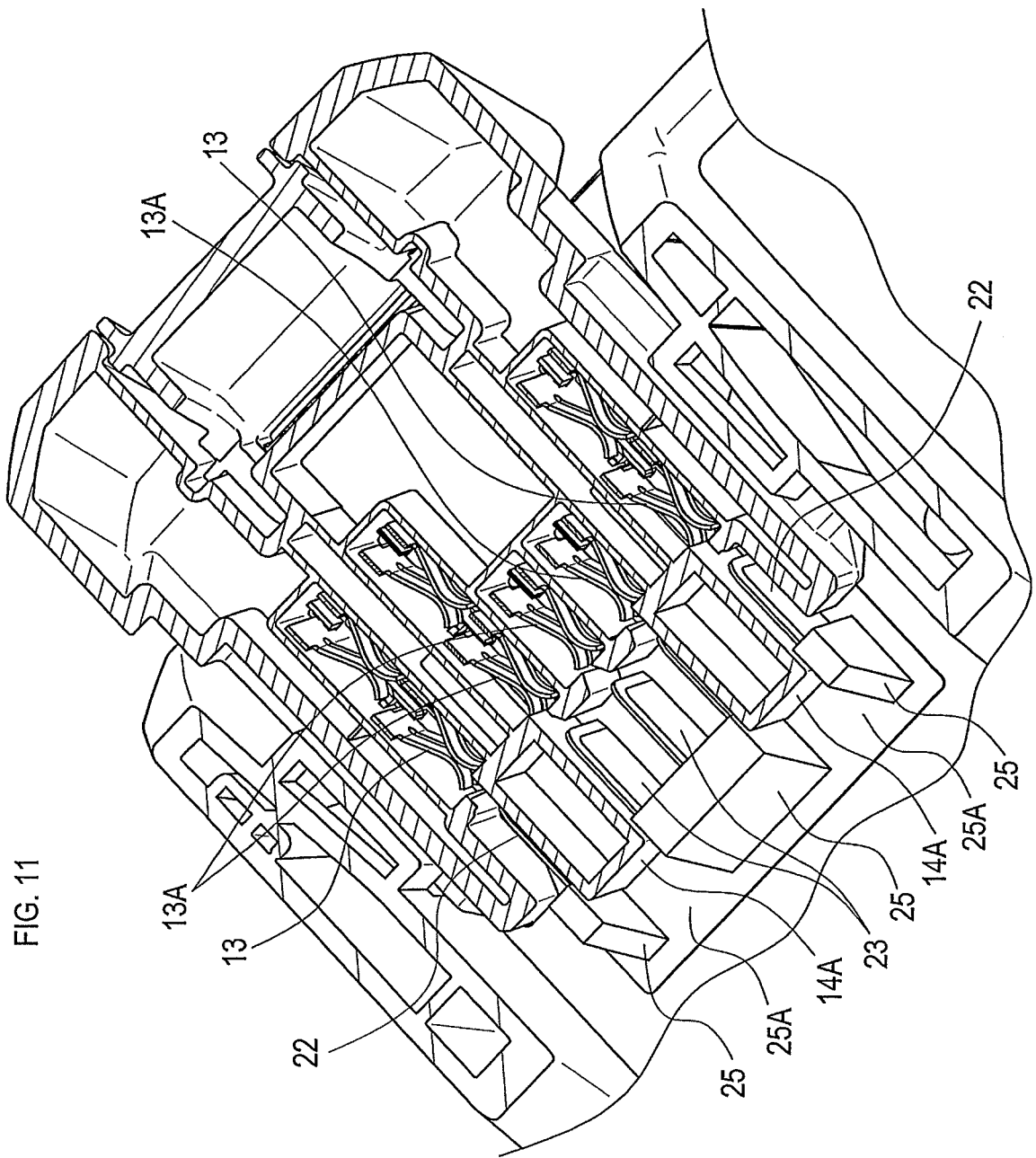
FIG. 11 is an explanatory view showing a state in which the battery pack according to the second embodiment is attached to the charger.

In addition, FIGS. 10A and 10B show the charger 20 to which the battery pack 10 according to the present embodiment can be attached. FIG. 11 shows a state in which the battery pack 10 according to the present embodiment is to be attached to the charger 20.

(Third Embodiment)

Figure 12A:
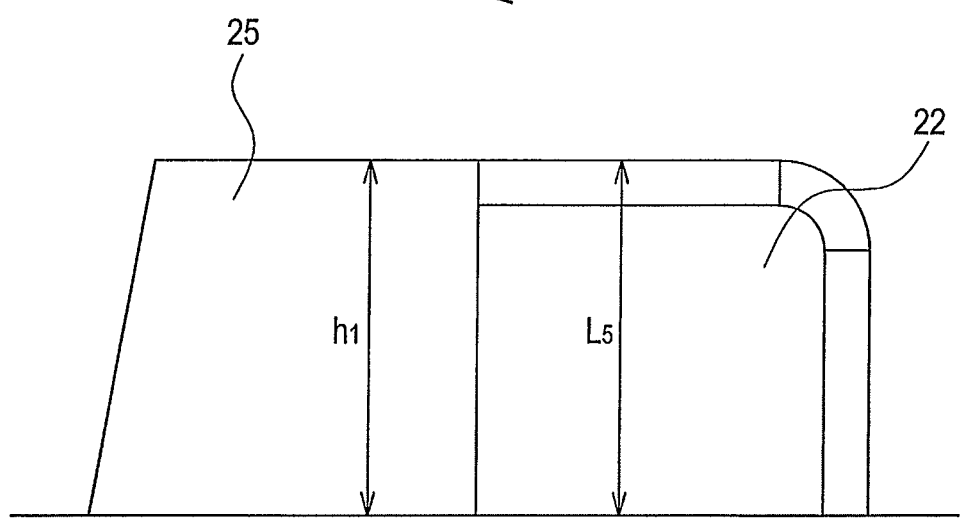
FIGS. 12A and 12B are side views of charger-side terminals according to a third embodiment of the present invention.
Figure 12B:
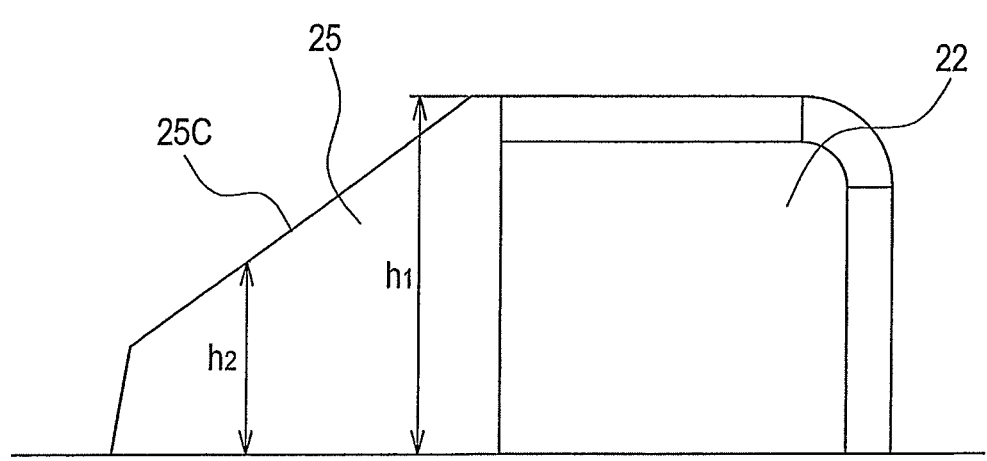

As shown in FIGS. 12A and 12B, in the present embodiment, the holding section height h1 of the holding section 25 is set to be equal to or less than the terminal height L5 on the holding section 25 side in the charger-side terminals 22, 23 (in FIGS. 12A and 12B, only the charging terminal 22 is shown).

In FIG. 12B, while the holding section height h1 is set to be equal to or less than the terminal height L5, a tapered surface 25C is provided in which the holding section height h2 gradually decreases with increase in distance from the charger-side terminals 22, 23 to the forward side in the attaching direction (front side in FIG. 12B).

Thus, in the present embodiment, it is possible to reliably move the foreign material 40 adhering to the tip ends in the protruding direction of the charger-side terminals 22, 23 to a region shifted from the charger-side terminals 22, 23. Also, the foreign material 40 moved by the push-out sections 14 to the holding sections 25 can be easily moved to outside the holding sections 25.

(Fourth Embodiment)

In the embodiments described above, the push-out sections 14 are formed as protrusions which continue from the openings 12A to the front end surfaces 14A. In the present embodiment, as shown in FIG. 13, the push-out sections 14 are formed by protrusions having the surfaces 14A intersecting the attaching direction. The push-out sections 14 according to the present embodiment may be either of cylindrical projections or prismatic projections.

(Other Embodiments)

In the first embodiment, the tapered surface 25B is provided only on the charger-side terminals 22, 23 side. The present invention is not limited thereto. The entire tip ends in the protruding direction of the holding sections 25 may be formed as the tapered surface 25B.

Further, in the above embodiments, the present invention has been described in a state where the attaching section 21 of the charger 20 is located on the upper surface side. The present invention is not limited thereto.

Further, in the embodiment described above, the charger-side terminals 22, 23 are formed into a shape of a strip, and the battery-side terminals 13, 13A are shaped so as to sandwich a plate surface of the charger-side terminals 22, 23. The present invention is not limited thereto. For example, to the contrary, the battery-side terminals 13, 13A may be strip-shaped, and the charger-side terminals 22, 23 may be shaped so as to sandwich a plate surface of the battery-side terminals 13, 13A.

Further, the holding sections 25 made of resin are provided in the embodiments described above. The present invention is not limited thereto. The holding sections 25 may be abolished or a width of the holding sections 25 may be reduced to be a level equal to a thickness of the charger-side terminals 22, 23.

Further, in the embodiments described above, the inserting holes 12 are in the form of a groove, an upper side in FIG. 3A of which is opened. The present invention is not limited thereto. The inserting holes 12 may be a hole extending to the rear side in the insertion direction from the openings 12A. In this case, it is preferable that the charger-side terminals 22, 23 are formed in a rod shape that extend to the rear side in the insertion direction from the holding sections 25 and are supported by the holding sections 25.

Further, in the embodiments described above, the upper sides of the charger-side terminals 22, 23 are opened in the charger 20. The present invention is not limited thereto. A covering member such as a cover may be provided on the upper sides of the charger-side terminals 22, 23.

Also, the present invention is not limited to the embodiments described above as long as the invention meets the meaning of the invention described in the claims.

The invention claimed is:

1. A foreign material removing structure for removing foreign material adhering to a charger-side terminal of a charger to which a battery pack for electric power tool is detachably attached, the foreign material removing structure comprising:
    an inserting hole that is provided in the battery pack, extends along an attaching direction of the battery pack, and includes an opening that the charger-side terminal can enter, the opening being formed on one end side in an extending direction of the inserting hole,
    a battery-side terminal that is provided in the inserting hole and is to be in contact with the charger-side terminal that enters the inserting hole from the opening when the battery pack is attached to the charger, and
    a push-out section that is provided on a further forward side in the attaching direction than the opening in the battery pack, and has a surface that intersects the attaching direction, the foreign material removing structure being configured such that the push-out section is located at a region shifted to the further forward side in the attaching direction than the charger-side terminal when the forward side in the attaching direction of the battery-side terminal is in contact with the charger-side terminal.

2. The foreign material removing structure according to claim 1, wherein a size from the surface of the push-out section to the battery-side terminal is larger than a size of a region parallel to the attaching direction in the charger-side terminal.

3. The foreign material removing structure according to claim 1, wherein
    the charger-side terminal protrudes in a direction orthogonal to the attaching direction from a base surface of the charger,
    the push-out section has a shape that protrudes in a direction orthogonal to the attaching direction from an outer wall surface of the battery pack,
    the outer wall surface of the battery pack and the base surface of the charger are opposed to each other, and a tip end in a protruding direction of the push-out section is located further on the base surface side than a tip end in a protruding direction of the charger-side terminal, when the battery pack is attached to the charger.

4. The foreign material removing structure according to claim 3, further comprising:
    a holding section made of electrically insulating material, the holding section being located on the forward side in the attaching direction with respect to the charger-side terminal and protruding in a direction parallel to the protruding direction of the charger-side terminal from the base surface to hold the charger-side terminal, wherein
    a holding section height which is a size from the base surface to the tip end in the protruding direction of the holding section is equal to or less than a terminal height which is a size from the base surface to the tip end in the protruding direction of the charger-side terminal.

5. The foreign material removing structure according to claim 3, wherein
    a holding section height on the charger-side terminal side in the holding section is equal to or less than a terminal height on the holding section side in the charger-side terminal,
    a tapered surface in which the holding section height gradually increases with increase in distance from the charger-side terminal to the forward side in the attaching direction is provided on the charger-side terminal side of the holding section,
    the holding section height is a size from the base surface to the tip end in the protruding direction of the holding section, and
    the terminal height is a size from the base surface to the tip end in the protruding direction of the charger-side terminal.

6. The foreign material removing structure according to claim 4, wherein
    the inserting hole has a pair of side wall sections that are provided so as to be opposed to each other across the battery-side terminal and extend from the opening to a rearward side in the attaching direction, and
    the push-out section is provided at a region corresponding to one of the pair of side wall sections.

7. The foreign material removing structure according to claim 5, wherein
    the inserting hole has a pair of side wall sections that are provided so as to be opposed to each other across the battery-side terminal and extend from the opening to a rearward side in the attaching direction, and
    the push-out section is provided at a region corresponding to one of the pair of side wall sections.

8. The foreign material removing structure according to claim 6, wherein
    the push-out section is configured as a protrusion that extends from one of the pair of side wall sections to the forward side in the attaching direction.

9. The foreign material removing structure according to claim 7, wherein
    the push-out section is configured as a protrusion that extends from one of the pair of side wall sections to the forward side in the attaching direction.

10. The foreign material removing structure according to claim 8, wherein
    the holding section is provided at a position shifted from a region corresponding to the push-out section.

11. The foreign material removing structure according to claim 9, wherein
    the holding section is provided at a position shifted from a region corresponding to the push-out section.

* * * * *